Patented May 28, 1946

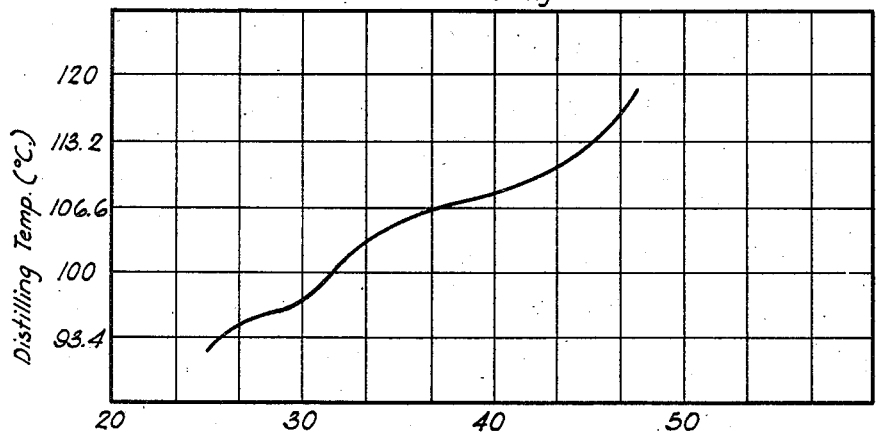
Fig. 1 Acetic Oil Distilled (% by weight)
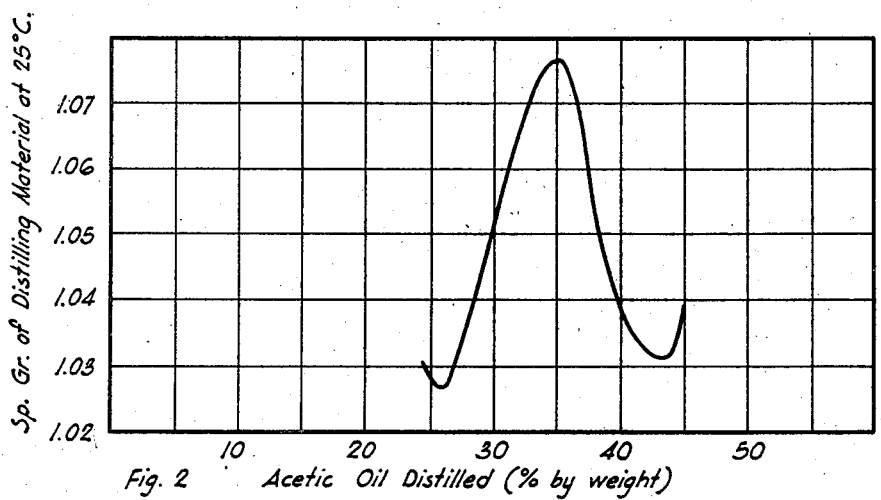
Fig. 2 Acetic Oil Distilled (% by weight)
INVENTORS
Alfred A. Reiter
Floyd L. Beman
BY
Griswold & Burdick
ATTORNEYS

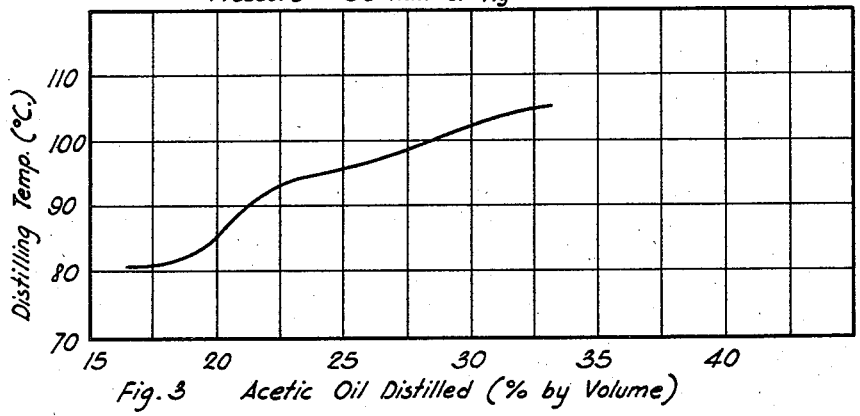
Fig. 3 Acetic Oil Distilled (% by Volume)
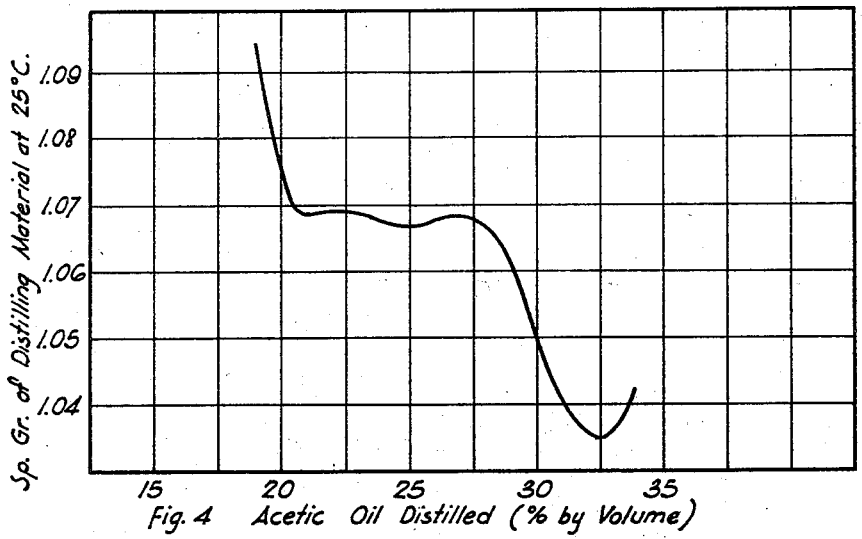
Fig. 4 Acetic Oil Distilled (% by Volume)

2,401,274

UNITED STATES PATENT OFFICE 2,401,274

SEPARATION OF ACETOL ACETATE FROM WOOD DISTILLATE

Alfred A. Reiter and Floyd L. Beman, Marquette, Mich., assignors to Cliffs Dow Chemical Company, Marquette, Mich., a corporation of Michigan Application September 29, 1942, Serial No. 460,168

12 Claims. (Cl. 202—40)

This invention relates to the isolation from pyroligneous acid of certain products not previously known to exist therein and more particularly to a method of isolating acetol acetate from a certain residue fraction of pyroligneous acid.

In the more recently developed methods for the treatment of pyroligneous acid, particularly that derived from hard woods, by distillation and extraction methods for the recovery of methanol, acetone, and acetic acid, the residues which, in the older liming process, usually appeared as tar, are separated to a considerable extent into settled tars and a mixture of organic compounds which are soluble in the crude aqueous acetic acid remaining after the pyroligneous acid is demethanolized and settled, and which are steam distilled from the aqueous solution along with the acetic acid. Such mixture of dissolved organic compounds usually appears as a non-tarry organic liquid after removal of the water and a major portion of the lower aliphatic acids from the distillate obtained by exhaustive steam distillation of demethanolized and settled pyroligneous acid, and is herein designated as "acetic oil" to distinguish it from other portions of tars or oils appearing in the process. In one typical process, the acetic oil is obtained by steam-distilling the demethanolized and settled pyroligneous acid without previous chemical treatment, extracting the aqueous distillate with an organic solvent, such as butyl acetate, ethyl acetate, ether, mixtures of ethyl acetate with isopropyl ether, etc., recovering the solvent by distilling it from the extract at atmospheric pressure, and fractionally distilling the remaining portion of the extract under reduced pressure to recover crude acetic acid and leave the acetic oil as a still residue. Acetic oil so obtained corresponds closely with the still residue remaining when the crude acid of United States Patent 2,197,069 is fractionally distilled under reduced pressure to recover therefrom a major proportion of the acetic acid. Acetic oil obtained in this manner amounts to a substantial portion of the total organic products obtained from pyroligneous acid.

Although the character of the acetic oil obtained as described above may vary somewhat, depending upon the exact manner of carrying out the several operations of the process, it is usually obtained as a substantially anhydrous, non-viscous, acidic liquid which is at least partially soluble in water or dilute acetic acid and which is miscible with most organic solvents. The specific gravity of the acetic oil is usually greater than 1.0.

Attempts to recover valuable components from the acetic oil by conventional methods involving treatment with alkalies or acids or distillation at atmospheric pressure lead to excessive decomposition. Fractional distillation under reduced pressure by the ordinary procedures, even with a high reflux ratio, is not feasible because the gradual and substantially constant rise of the distilling temperature and the variation in composition mentioned above make it impossible to select accurately a fraction rich in a single component. Little, if any, information as to the composition of this oil has heretofore been available other than that it contains certain phenolic substances, and that small amounts of volatile acids, e. g., acetic and propionic acids, may be recovered from it by steam distillation. The principal use for acetic oil has heretofore been as fuel.

We have discovered, as disclosed in our concurrently filed and copending application, Serial No. 460,167, that acetol acetate is one of the components of acetic oil and that it may be readily isolated in the manner herein described. Attempts to collect fractions sufficiently rich in acetol acetate to permit isolation of the product in a substantially pure state by fractionally distilling the acetic oil under reduced pressure and selecting the fraction in the usual manner have been uniformly unsuccessful. The difficulty of controlling the fractionation by observing the distilling temperature is illustrated in Figure 1 of the drawings in which the vapor temperatures of the material distilling in the neighborhood of 100° C. when at 50 millimeters pressure, i. e. when in the neighborhood of the boiling point of acetol acetate at 50 millimeters pressure, noted during a distillation of a representative sample of acetic oil are plotted against the per cent by weight of the acetic oil distilled.

We have found, however, that when the specific gravity of the material distilling in the neighborhood of 100° C. at 50 millimeters pressure is continuously determined it varies in such a manner that it passes through a region where-in its average rate of change with respect to the amount of material distilled is relatively small, and, furthermore, that the material distilling while the specific gravity is passing through this region is rich in acetol acetate. The graph in Figure 2 of the drawings was obtained by plotting the specific gravity of the material condensing during the distillation just referred to against the per cent by weight of acetic oil distilled. The region in which the average rate of change of the specific gravity with respect to the amount of material distilled is relatively small is represented by the portion of the curve near the maximum point. The rate of change of the specific gravity was actually zero when its value was 1.076. It is thus possible to select a fraction of acetic oil rich in acetol acetate by fractionally distilling the oil, preferably through an efficient fractionating column, and beginning collection of the fraction which distils in the neighborhood of 100° C. at 50 millimeters pressure when the specific gravity of the distillate is approaching a region where its average rate of change with respect to the amount of material distilled becomes relatively small and terminating the collection of the fraction when the specific gravity has passed through and is receding from said region. The distillation may be carried out at any desired pressure, but it is usually carried out under sub-atmospheric pressure and preferably at a pressure below 400 millimeters of mercury since some decomposition of the less heat stable components may occur at higher temperatures. Although the collection of the fraction is controlled by means of specific gravity determinations on the condensing material, it is advantageous to observe the distilling temperature during the collection of the fraction, since at a given pressure the general temperature range in which the fraction distills will ordinarily include or lie close to, e. g. within about 15° C. of the boiling point of pure acetol acetate at the corresponding pressure, and will thus serve to differentiate it from other fractions of the acetic oil which may be collected over the same range of specific gravity but over different temperature ranges. The acetol acetate fraction is then neutralized, i. e. treated with sufficient alkali to form the metal salts of the free acids which may have distilled with the acetol acetate from the acetic oil.

Alternatively, the acetic oil may be first neutralized and then fractionally distilled, the acetol acetate fraction being collected in the manner described above. In this case neutralization of the acetol acetate fraction collected is not ordinarily necessary. The distilling temperature and the specific gravity of the material distilling in the neighorhood of 100° C. at 50 millimeters pressure, noted continuously during the distillation of a neutralized representative sample of acetic oil, are shown in Figures 3 and 4, respectively, of the drawings plotted against the per cent by volume of material distilled. Figure 3 illustrates the gradual rise in the distilling temperature during the distillation and Figure 4 illustrates the passage of the specific gravity of the material condensing through the region where its average rate of change with respect to the amount of material distilled becomes relatively small, i. e., the region in which the material distilling is rich in acetol acetate. The region, in this case, is represented by the part of the curve which approaches parallelism with the distillate axis.

Neutralization of the acetic oil or of the acetol acetate fraction obtained by distilling the acetic oil is usually accomplished by adding an amount of an alkali such as sodium carbonate, potassium carbonate, sodium hydroxide, sodium bicarbonate, calcium hydroxide, etc., sufficient to give the mixture a pH of from 5.5 to 8. An excess of alkali over that sufficient to combine with the free acids present is usually avoided, since such excess of alkali will tend to cause hydrolysis of the acetol acetate. Neutralization is C., and preferably below 40° C., to reduce hydrolysis of the acetol acetate to a minimum. Sufficient water may be used to dissolve the salts formed, although an excess is preferably avoided since acetol acetate is soluble in water and is more easily separated from the aqueous portion of the neutralized mixture if the concentration of salts in the aqueous portion is kept as high as possible. After neutralization is complete, the neutral components of the mixture, which usually form a distinct layer, are separated from the solution of the salts formed during the neutralization, either mechanically or by extracting with a water-immiscible organic solvent, e. g. with benzene, carbon tetrachloride, ethyl acetate, ether, etc., and subsequently distilling the extract to recover the solvent. Water-soluble compounds, such as sodium chloride, may be added to the neutralized mixture to facilitate the separation of the acetol acetate but this is not usually desirable when the acids are to be recovered from the aqueous portion of the mixture. Aternatively, a substantially dry alkaline material, such as powdered sodium carbonate, may be used to neutralize the acids present and the neutral oils may be separated from the solid salts so formed by decanting or filtering.

The salts formed during the neutralization may be treated in any suitable manner to recover the acidic compounds originally present in the acetic oil, preferably by acidifying with mineral acids to liberate the organic acids and subsequently separating and fractionally distilling the crude acids so obtained. Butyric acid may be recovered in this manner from the salts formed during neutralization of the acetol acetate fraction obtained by fractionally distilling acetic oil. The salts formed during the neutralization of acetic oil before fractionation may be treated in a similar manner to recover acetic, propionic, butyric, crotonic and higher boiling acids.

The neutral acetol acetate fraction resulting from the neutralization and fractional distillation steps just described may, if desired, be further purified, e. g. by refractionating. In the case of neutral acetol acetate fractions obtained by first fractionally distilling the acetic oil and then neutralizing the acetol acetate fraction, refractionation is preferably preceded by a simple distillation to free the material from the last traces of salts, since prolonged heating of the acetol acetate with such salts may cause considerable decomposition or other by-product formation. Refractionation of the acetol acetate fraction is usually carried out under reduced pressure, and the acetol acetate collected when the boiling point of the distilling material is 100° C. at 50 millimeters pressure.

Certain advantages of the invention will be seen from the following examples, which are illustrative and are not to be construed as limiting the invention:

*Example 1*

1360 pounds of unneutralized acetic oil were distilled at a pressure of 50 millimeters of mercury through an efficient fractionating column while maintaining a reflux ration of about 8 to 1. The specific gravity at 25° C. of the material distilling and the temperature of the vapor in the still head were noted from time to time. The distilling temperature rose gradually without remaining constant at any point for an appreciable time. The rate of change of the specific gravity of the material distilling with respect substantially regular manner through a series of regions in which its average value was successively relatively small and relatively large. When the temperature had reached 97.5° C. and the specific gravity of the material distilling was 1.049, and increasing, the collection of the acetol acetate fraction was begun. Collection of the fraction was continued until the specific gravity after having increased to 1.076 had decreased to 1.046, at which point the collection of the fraction was terminated. The fraction weighed 122.6 pounds.

Several fractions rich in acetol acetate obtained in the manner just described were combined and 1565 pounds of the mixture were neutralized to a pH of 7 with 87 pounds of sodium carbonate and 738 pounds of water. The neutralized mixture, upon standing, separated into two layers. The oily layer, which weighed 1384 pounds, was distilled without fractionation at a pressure of 20 millimeters to free it from traces of salts, and the distillate, which weighed 1266 pounds, was then distilled at a pressure of 50 millimeters of mercury through an efficient fractionating column while maintaining a reflux ratio of about 8 to 1. The fraction boiling at 100° C. was collected. The fraction collected weighed 462 pounds and was about 95 per cent pure acetol acetate.

*Example 2*

36,000 cc. of acetic oil were mixed with 36,000 cc. of water and neutralized to a pH of 7 with 2880 grams of sodium carbonate while maintaining the temperature of the mixture below 40° C. 26,500 cc. of an oily layer were separated from the mixture and distilled under vacuum without fractionation. The distillate was then redistilled at a pressure of 50 millimeters of mercury through an efficient fractionating column while maintaining a reflux ratio of about 10 to 1. The specific gravity at 25° C. of the material distilling and the distilling temperature were noted periodically. A first or fore-fraction of 7100 cc. was collected. At this point the specific gravity of the material distilling was 1.082, and decreasing, and the distilling temperature was 84° C. Collection of the acetol acetate fraction was then begun. Distillation was continued until the specific gravity after decreasing to 1.069 had changed relatively little during the collection of several thousand cubic centimeters of distillate and had then decreased to 1.050. At this point the collection of the fraction was discontinued. The fraction so collected, consisting of 3700 cc. of a liquid rich in acetol acetate, was refractionated as in Example 1 and yielded a major proportion of pure acetol acetate.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method for separating acetol acetate from a mixture selected from the class consisting of acetic oil and acetic oil which has been freed of acidic ingredients by neutralization, the steps which consist in fractionally distilling the mixture and beginning collection of a fraction of distillate, which distills for the most part at temperatures within the range of from 84° to 107° C. at a pressure of 50 millimeters of mercury, when the specific gravity of the material distilling is receding from a region in which there was a reversal of the direction of change of specific gravity of the material being distilled and is approaching a region wherein its average rate of change with respect to the amount of material distilled is relatively small and terminating collection of the fraction when the specific gravity has passed through and is receding from the last-mentioned region.

2. In a method for separating acetol acetate from acetic oil, the steps which consist in fractionally distilling the acetic oil and beginning collection of a fraction of distillate, which distills for the most part at temperatures within the range of from 84° to 107° C. at a pressure of 50 millimeters of mercury, when the specific gravity of the material distilling is increasing and is of a value greater than 1.03 and less than 1.07 and terminating collection when the specific gravity is decreasing and, after having increased to a value above the range just stated, has returned to a value within said range.

3. In a method for separating acetol acetate from acetic oil, the steps which consist in freeing the acetic oil from acidic ingredients by neutralizing and subsequently fractionally distilling the neutralized acetic oil and beginning the collection of a fraction of distillate, which distills for the most part at temperatures within the range of from 84° to 107° C. at a pressure of 50 millimeters of mercury, when the specific gravity of the material distilling is receding from a region in which there was a reversal of the direction of change of specific gravity of the material being distilled and is approaching a region wherein its average rate of change with respect to the amount of material distilled is relatively small and terminating collection of the fraction when the specific gravity has passed through and is receding from the last-mentioned region.

4. In a method for separating acetol acetate from acetic oil, the steps which consist in freeing the acetic oil from acidic ingredients by neutralizing at a temperature below about 80° C. and subsequently fractionally distilling the neutralized acetic oil and beginning the collection of a fraction of distillate, which distills for the most part at temperatures within the range of from 84° to 107° C. at a pressure of 50 millimeters of mercury, when the specific gravity of the material distilling is receding from a region in which there was a reversal of the direction of change of specific gravity of the material being distilled and is approaching a region wherein its average rate of change with respect to the amount of material distilled is relatively small and terminating collection of the fraction when the specific gravity has passed through and is receding from the last-mentioned region.

5. In a method for separating acetol acetate from acetic oil, the steps which consist in freeing the acetic oil from acidic ingredients by neutralizing at a temperature below 40° C. and subsequently fractionally distilling the neutralized acetic oil and beginning the collection of a fraction of distillate, which distills for the most part at temperatures within the range of from 84° to 107° C. at a pressure of 50 millimeters of mercury, when the specific gravity of the material distilling is receding from a region in which there was a reversal of the direction of change of specific gravity of the material being distilled and is approaching a region wherein its average rate of change with respect to the amount of material distilled is relatively small and terminating collection of the fraction when the specific gravity has passed through and is receding from the last-mentioned region.

6. In a method for separating acetol acetate from acetic oil, the steps which consist in freeing the acetic oil from acidic ingredients by neutralizing to a pH of from 5.5 to 8 at a temperature below 40° C. and subsequently fractionally distilling the neutralized acetic oil and beginning the collection of a fraction of distillate, which distills for the most part at temperatures within the range of from 84° to 107° C. at a pressure of 50 millimeters of mercury, when the specific gravity of the material distilling is receding from a region in which there was a reversal of the direction of change of specific gravity of the material being distilled and is approaching a region wherein its average rate of change with respect to the amount of material distilled is relatively small and terminating collection of the fraction when the specific gravity has passed through and is receding from the last-mentioned region.

7. In a method for separating acetol acetate from acetic oil, the steps which consist in freeing the acetic oil from acidic ingredients by neutralizing with sodium carbonate to a pH of from 5.5 to 8 at a temperature below 40° C., separating neutral components from the neutralized mixture, freeing the separated neutral components from salts by distillation, and subsequently fractionally distilling the neutralized, salt-free acetic oil and beginning the collection of a fraction of distillate, which distills for the most part at temperatures within the range of from 84° to 107° C. at a pressure of 50 millimeters of mercury, when the specific gravity of the material distilling is receding from a region in which there was a reversal of the direction of change of specific gravity of the material being distilled and is approaching a region wherein its average rate of change with respect to the amount of material distilled is relatively small and terminating collection of the fraction when the specific gravity has passed through and is receding from the last-mentioned region.

8. In a method for separating acetol acetate from acetic oil, the steps which consist in fractionally distilling the acetic oil and beginning the collection of a fraction of distillate, which distills for the most part at temperatures within the range of from 84° to 107° C. at a pressure of 50 millimeters of mercury, when the specific gravity of the material distilling is increased and is of a value greater than 1.03 and less than 1.07 and terminating collection when the specific gravity is decreasing and, after having increased to a value above the range just stated, has returned to a value within said range, subsequently freeing the collected fraction from acidic ingredients by neutralizing to a pH of from 5.5 to 8 at a temperature below 40° C. and removing the salt thus formed.

9. In a method for separating acetol acetate from acetic oil, the steps which consist in fractionally distilling the acetic oil and beginning the collection of a fraction of distillate, which distills for the most part at temperatures within the range of from 84° to 107° C. at a pressure of 50 millimeters of mercury, when the specific gravity of the material distilling is increasing and is of a value greater than 1.03 and less than 1.07 and terminating collection when the specific gravity is decreasing and, after having increased to a value above the range just stated, has returned to a value within said range and subsequently freeing the collected fraction from acidic ingredients by neutralizing with sodium carbonate to a pH of from 5.5 to 8 at a temperature below 40° C.

10. In a method for separating acetol acetate from a mixture selected from the class consisting of acetic oil and acetic oil which has been freed of acidic ingredients by neutralization, wherein the mixture is fractionally distilled and a fraction of distillate rich in acetol acetate is collected, the steps which consist in beginning the collection of said fraction when the specific gravity of the material distilling is receding from a region in which there was a reversal of the direction of change of specific gravity of the material being distilled and is approaching a region wherein its average rate of change with respect to the amount of material distilled is relatively small and terminating the collection of the fraction when the specific gravity has passed through and is receding from the last-mentioned region.

11. A method of separating acetol acetate from acetic oil comprising fractionally distilling the acetic oil under reduced pressure and beginning the collection of a fraction of distillate, which distills for the most part at temperatures within the range of from 84° to 107° C. at a pressure of 50 millimeters of mercury, when the specific gravity of the material distilling is receding from a region in which there was a reversal of the direction of change of specific gravity of the material being distilled and is approaching a region wherein its average rate of change with respect to the amount of material distilled is relatively small and terminating the collection of the fraction when the specific gravity has passed through and is receding from the last-mentioned region, removing acidic ingredients from the fraction so collected by neutralizing with sodium carbonate to a pH of from 5.5 to 8 while maintaining the temperature below 40° C., and separating the neutral organic components from the neutralized mixture, fractionally distilling said neutral organic components under reduced pressure, and collecting a fraction consisting of substantially pure acetol acetate.

12. A method of separating acetol acetate from acetic oil comprising fractionally distilling the acetic oil under vacuum and beginning the collection of a fraction of distillate, which distills for the most part at temperatures within the range of from 84° to 107° C. at a pressure of 50 millimeters of mercury, when the specific gravity of the material distilling is increasing and approaching a region wherein its value is in the neighborhood of 1.070 and its average rate of change with respect to the amount of material distilled is relatively small and terminating the collection of the fraction when the specific gravity has passed through and is receding from said region, removing butyric acid from the fraction so collected by neutralizing with sodium carbonate to a pH of from 5.5 to 8 while maintaining the temperature below 40° C. and separating neutral organic components from the neutralized mixture, freeing said neutral organic components from salts by distillation, fractionally distilling said neutral organic components under reduced pressure and collecting a fraction consisting of substantially pure acetol acetate.

ALFRED A. REITER.
FLOYD L. BEMAN.